(12) United States Patent
Munoz

(10) Patent No.: US 12,310,346 B2
(45) Date of Patent: May 27, 2025

(54) ROD HOLDER

(71) Applicant: Jose Munoz, San Antonio, TX (US)

(72) Inventor: Jose Munoz, San Antonio, TX (US)

( * ) Notice: Subject to any disclaimer, the term of this patent is extended or adjusted under 35 U.S.C. 154(b) by 75 days.

(21) Appl. No.: 17/814,167

(22) Filed: Jul. 21, 2022

(65) Prior Publication Data

US 2023/0029189 A1 Jan. 26, 2023

Related U.S. Application Data

(60) Provisional application No. 63/224,645, filed on Jul. 22, 2021.

(51) Int. Cl.
*A01K 97/10* (2006.01)
*A01K 97/08* (2006.01)

(52) U.S. Cl.
CPC .............. *A01K 97/10* (2013.01); *A01K 97/08* (2013.01)

(58) Field of Classification Search
CPC ................................ A01K 97/10; A01K 97/08
USPC ............ 43/21.2, 26; 224/920, 922, 400–402, 224/488, 489, 502, 504, 511, 512, 224/522–527; 206/315.11; 211/70.8
See application file for complete search history.

(56) References Cited

U.S. PATENT DOCUMENTS

| | | | | |
|---|---|---|---|---|
| 1,884,736 A | * | 10/1932 | King .................. | B60R 9/065 190/15 A |
| 3,266,633 A | * | 8/1966 | Graebner, V ......... | B60R 9/02 224/571 |
| 3,746,177 A | * | 7/1973 | Vilotti ................. | F41A 23/18 211/64 |
| 4,154,362 A | * | 5/1979 | McKenney .......... | B65D 43/168 16/225 |
| 4,293,113 A | * | 10/1981 | Gray ................... | A01K 97/10 224/482 |
| 4,501,457 A | * | 2/1985 | Pond ................... | A47B 5/06 224/567 |
| 4,523,704 A | * | 6/1985 | Washington ........ | B60R 9/055 224/329 |
| 4,634,019 A | * | 1/1987 | Pherigo .............. | B65D 43/163 220/810 |
| 4,648,516 A | * | 3/1987 | Elkins ................. | A47B 81/005 224/482 |
| 4,871,099 A | * | 10/1989 | Bogar, Jr. .......... | A01K 97/10 248/512 |
| 4,881,674 A | * | 11/1989 | Medianik ........... | B60R 5/006 224/326 |
| 4,901,895 A | * | 2/1990 | Gancarz ............. | B60R 19/48 293/106 |
| 4,917,430 A | * | 4/1990 | Lawrence .......... | B60R 9/02 224/281 |

(Continued)

FOREIGN PATENT DOCUMENTS

AU    2016213731 A1 *  3/2017
KR    101513444 B1 *  4/2015

(Continued)

*Primary Examiner* — Darren W Ark
(74) *Attorney, Agent, or Firm* — Brandon T. Cook; Gunn, Lee & Cave, P.C.

(57) ABSTRACT

A fishing rod holder with a back plate and a cover. The cover can be secured in either the open or closed position. In the closed position, the rod holder acts as a rod holder and a toolbox. In the open position, the rod holder acts as a utility table. The rod holder can be attached to a vehicle, boat, or other base using a mounting plate.

2 Claims, 19 Drawing Sheets

(56) References Cited

U.S. PATENT DOCUMENTS

| | | | | |
|---|---|---|---|---|
| 4,979,634 A * | 12/1990 | Begley | H01H 9/287 | 174/67 |
| 4,986,427 A * | 1/1991 | Law | A47B 81/005 | 211/117 |
| 5,033,223 A * | 7/1991 | Minter | A01K 97/10 | 248/538 |
| 5,137,319 A * | 8/1992 | Sauder | A01K 97/10 | 294/143 |
| 5,205,446 A * | 4/1993 | Greenberg | B60R 9/08 | 224/511 |
| 5,303,500 A * | 4/1994 | Luukonen | A01K 97/01 | 206/315.11 |
| 5,395,019 A * | 3/1995 | Christensen | B60R 11/06 | 224/406 |
| 5,435,473 A * | 7/1995 | Larkum | B60R 9/08 | 211/70.8 |
| 5,441,167 A * | 8/1995 | Shigeru | E05D 11/06 | 16/374 |
| 5,632,427 A * | 5/1997 | Gattuso | A01K 97/10 | 248/512 |
| 5,657,883 A * | 8/1997 | Badia | A01K 97/10 | D6/552 |
| 5,715,952 A * | 2/1998 | Chichetti | A01K 97/10 | 248/512 |
| 5,815,976 A * | 10/1998 | Jernigan | A01K 97/10 | 248/538 |
| 5,904,281 A * | 5/1999 | Mooers | B60R 9/08 | 224/525 |
| 5,913,673 A * | 6/1999 | Womac | A01K 97/10 | 43/21.2 |
| 6,047,491 A * | 4/2000 | De Busk | A01K 97/08 | 248/512 |
| 6,250,480 B1 * | 6/2001 | McGuinness | A47F 7/0028 | D6/552 |
| 6,401,381 B1 * | 6/2002 | Broberg | A01K 97/08 | 248/512 |
| 6,510,953 B2 * | 1/2003 | Daniels | A47B 81/005 | 211/89.01 |
| 6,530,170 B1 * | 3/2003 | Sweeney | A01K 97/10 | 43/21.2 |
| 6,742,789 B1 * | 6/2004 | Nowak | B25H 3/00 | 280/652 |
| 6,883,268 B2 * | 4/2005 | Fraser | A01K 97/22 | 248/512 |
| 7,044,344 B2 * | 5/2006 | Winkler | A63B 71/00 | 224/511 |
| 7,165,703 B1 * | 1/2007 | Howe | A01K 97/10 | 224/406 |
| 7,219,464 B1 * | 5/2007 | Kujawa | A01K 97/08 | 211/8 |
| 7,322,149 B1 * | 1/2008 | Quintero | A01K 97/08 | 206/315.11 |
| 7,472,510 B1 * | 1/2009 | Fasola | A01K 97/08 | 43/21.2 |
| 7,574,773 B2 * | 8/2009 | Dahl | E05D 1/04 | 16/259 |
| 7,937,883 B2 * | 5/2011 | Roemer | A01K 97/08 | 248/512 |
| 8,251,253 B1 * | 8/2012 | Cleghorn | H02G 3/14 | 174/67 |
| 8,393,111 B1 * | 3/2013 | Johnson | A01K 97/10 | 43/21.2 |
| 8,424,698 B2 * | 4/2013 | I | B60R 16/0238 | 220/3.8 |
| 8,584,322 B2 * | 11/2013 | Nakasone | E05D 11/105 | 16/386 |
| 10,058,086 B1 * | 8/2018 | Mooney | A01K 97/10 | |
| 10,182,653 B1 * | 1/2019 | Long | A47B 81/005 | |
| 11,019,924 B2 * | 6/2021 | Neese | A47B 43/00 | |
| 11,344,016 B1 * | 5/2022 | Foisie | A47B 81/005 | |
| 2007/0187447 A1 * | 8/2007 | Hamann | A01K 97/08 | 224/520 |
| 2008/0087785 A1 * | 4/2008 | Roche | A47B 81/005 | 248/309.4 |
| 2009/0071991 A1 * | 3/2009 | Evans | B60R 9/00 | 224/402 |
| 2011/0073628 A1 * | 3/2011 | Inoue | B62K 19/46 | 224/488 |
| 2011/0204109 A1 * | 8/2011 | Knutson | B60R 9/08 | 43/21.2 |
| 2014/0137522 A1 * | 5/2014 | Junior | B65D 43/164 | 53/492 |
| 2015/0123425 A1 * | 5/2015 | Huston | B60P 7/0815 | 296/183.1 |
| 2015/0216301 A1 * | 8/2015 | Yates | A47B 81/005 | 211/13.1 |
| 2015/0223439 A1 * | 8/2015 | Caudle | A01K 97/10 | 43/21.2 |
| 2019/0193641 A1 * | 6/2019 | Garza, Jr. | B60R 9/08 | |
| 2024/0085754 A1 * | 3/2024 | Martinson | G02F 1/163 | |

FOREIGN PATENT DOCUMENTS

KR 20210001546 U * 7/2021
KR 200496258 Y1 * 12/2022

* cited by examiner

ROD HOLDER

CROSS-REFERENCES TO RELATED APPLICATIONS

This application claims the benefit of, and incorporates by reference herein, U.S. provisional patent application No. 63/224,645 filed Jul. 22, 2021.

STATEMENT REGARDING FEDERALLY SPONSORED RESEARCH OR DEVELOPMENT

Not applicable.

BACKGROUND OF THE INVENTION

1. Field of the Invention

Automotive accessories such as cargo carriers, and in particular, rod holders, are commonly used by drivers. Large and oblong items such as fishing rods are difficult to store inside the cab of a truck or the interior of a car. Further, the presence of fishing hooks makes it dangerous to store fishing rods inside an occupied vehicle. The present invention is a novel automobile accessory designed to attach to the front bumper of a vehicle and hold fishing rods and other items. The present invention can also be removed from an automobile and used with a boat or other device.

SUMMARY OF THE INVENTION

The rod holder comprises a back plate, a cover, and a plurality of cylindrical tubes integral the back plate. The cover can be secured in either an open or a closed position. In the closed position, the interior of the rod holder is securely enclosed and the contents secured therein. In the open position, the cover acts as a utility table.

DETAILED DESCRIPTION

Figure 1:
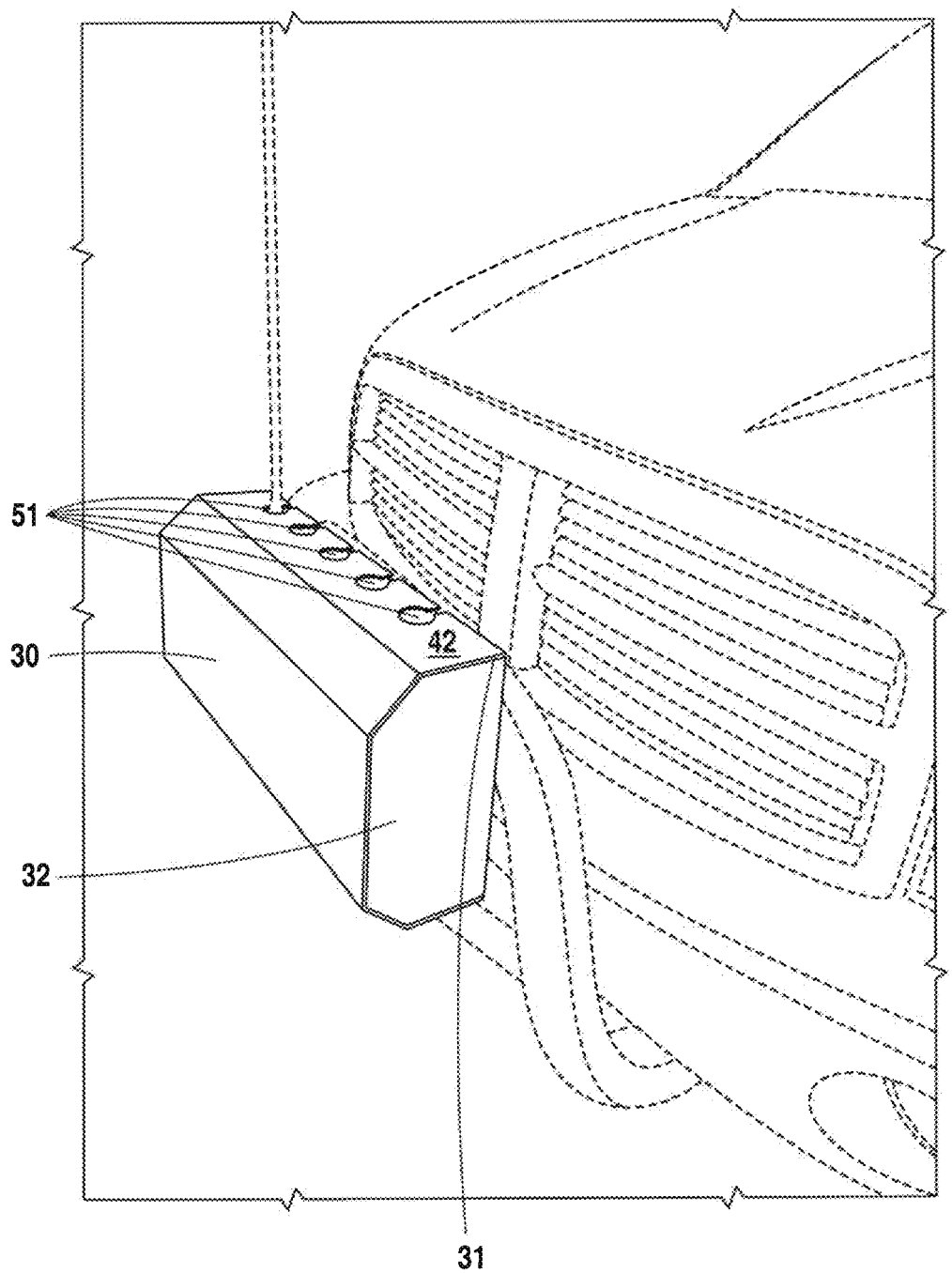
FIG. 1 is a perspective view of a first embodiment of the rod holder mounted to the front bumper of a pick-up truck in the closed position.
Figure 2:
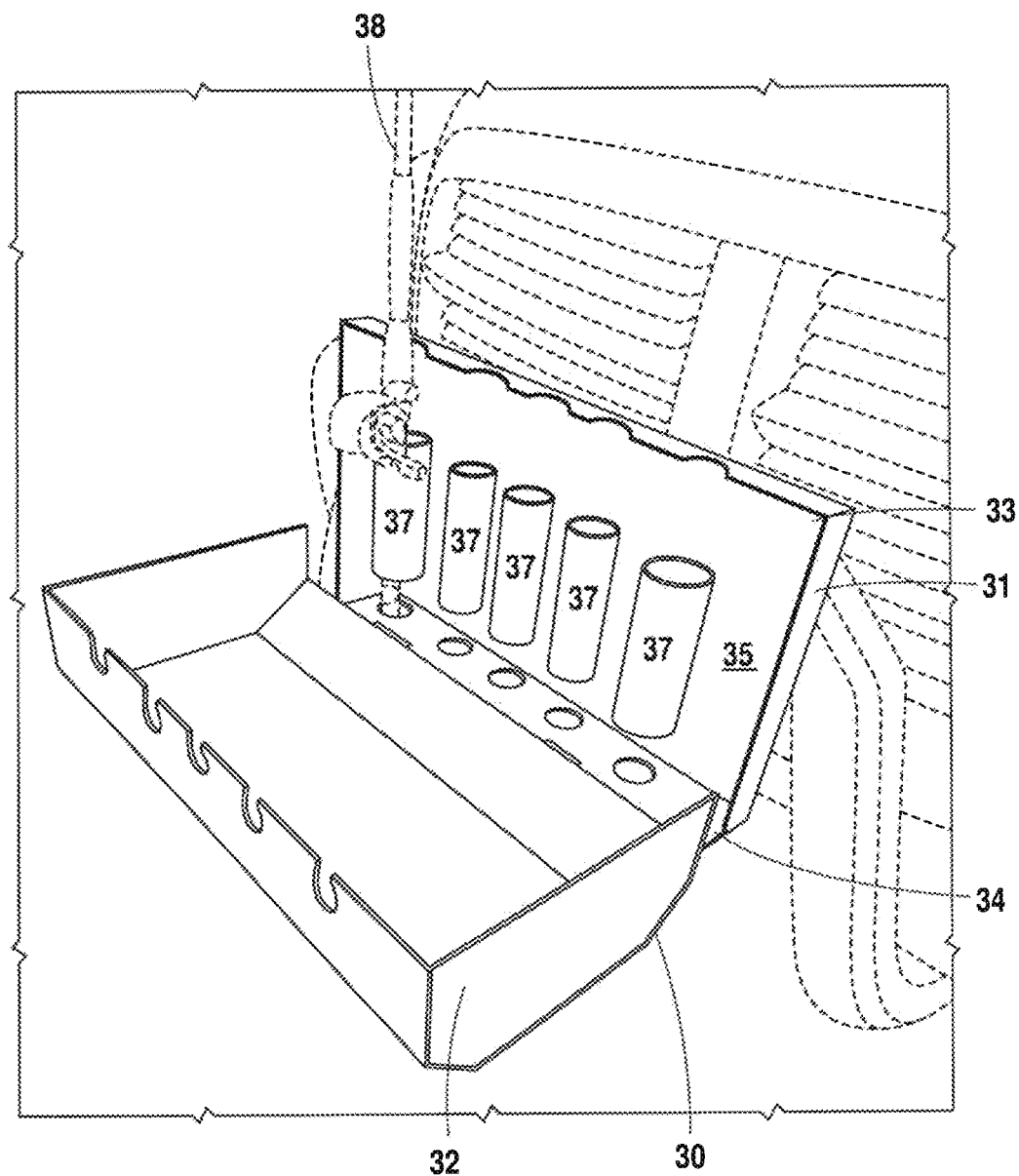
FIG. 2 is a perspective view of the first embodiment of the rod holder mounted to the front bumper of a pick-up truck in the open position.
Figure 3:
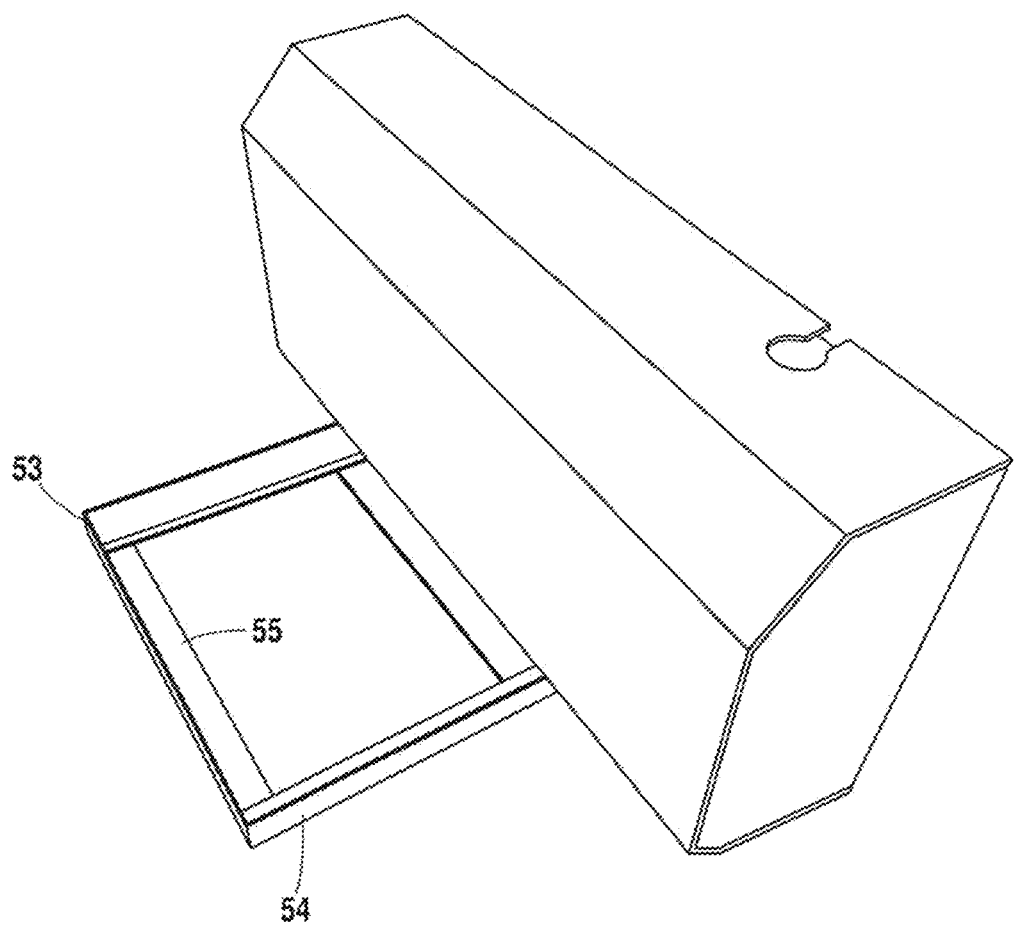
FIG. 3 a perspective view of a second embodiment of the rod holder.
Figure 4:
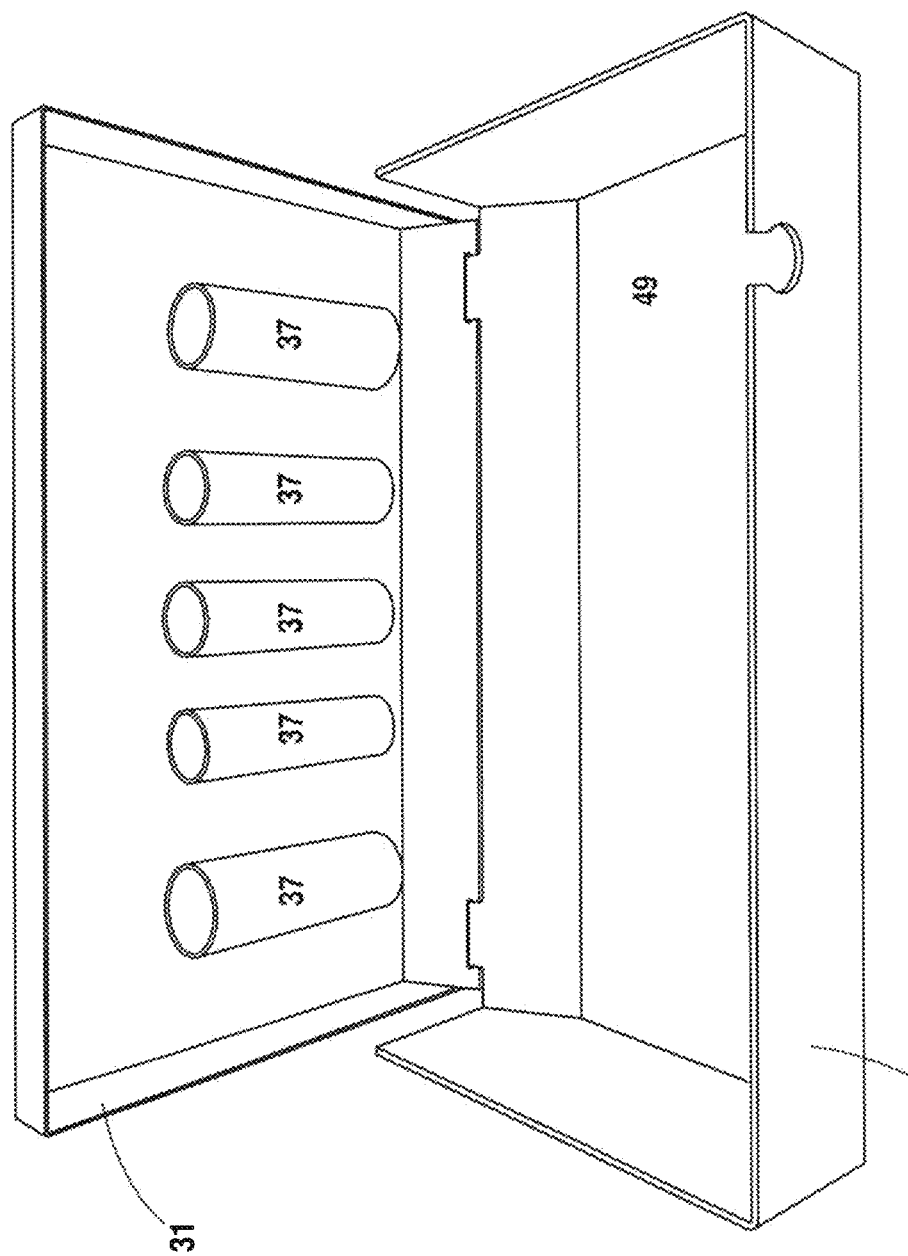
FIG. 4 is a top view of the first embodiment of the rod holder in the open position.
Figure 5:
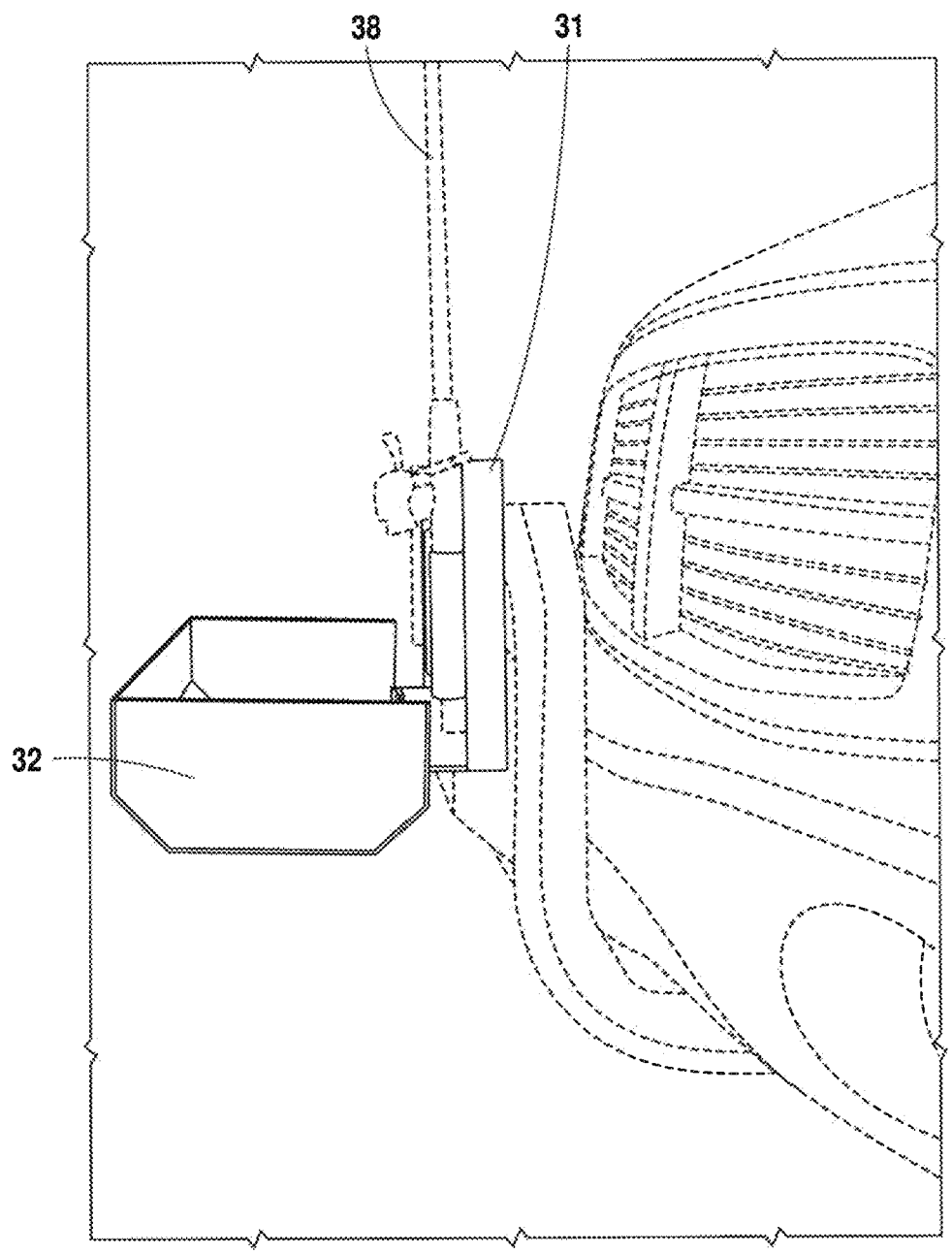
FIG. 5 is a side view of the first embodiment of the rod holder in the open position.
Figure 6:
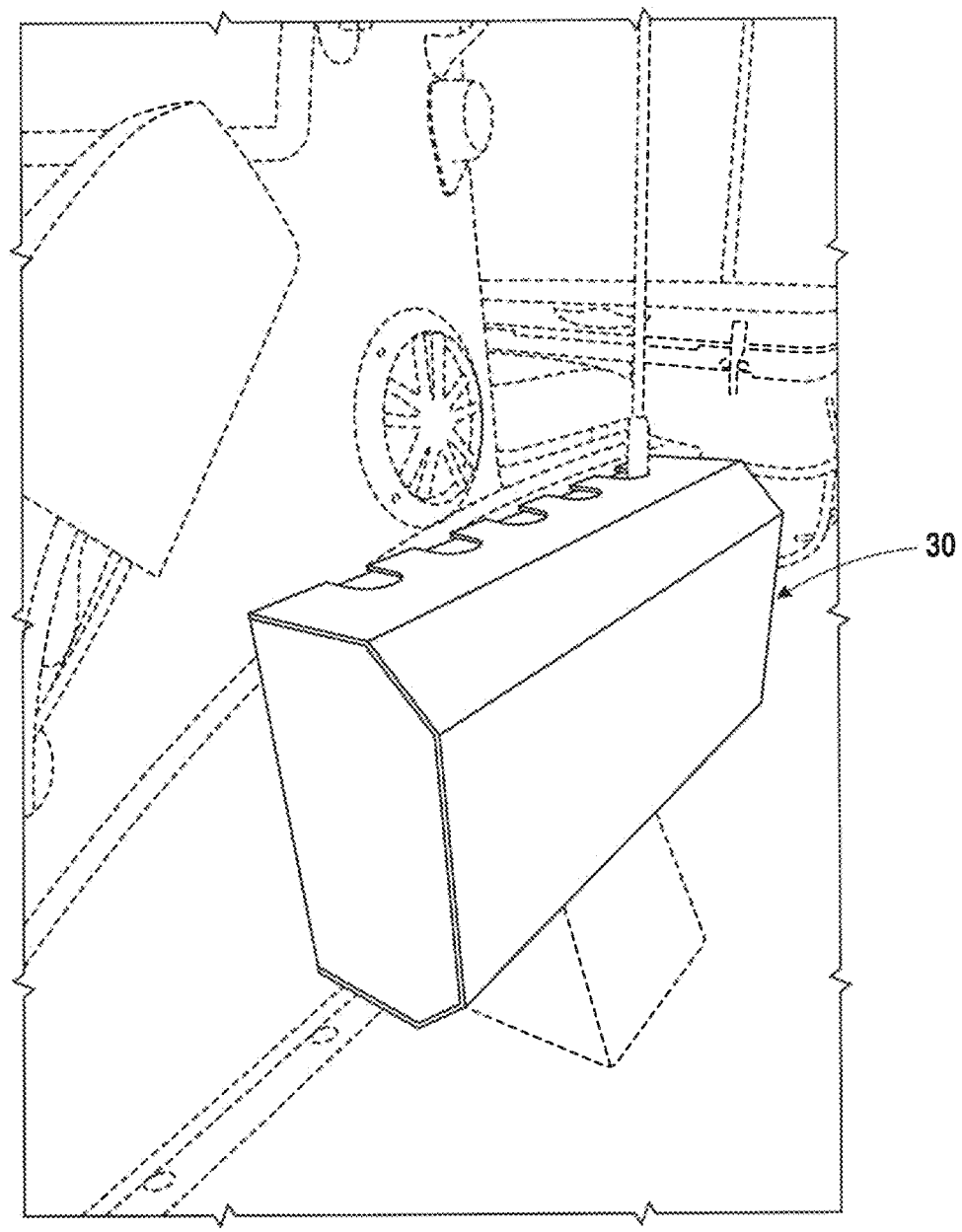
FIG. 6 is a perspective view of the first embodiment of the rod holder in the closed position mounted on a boat.
Figure 7:
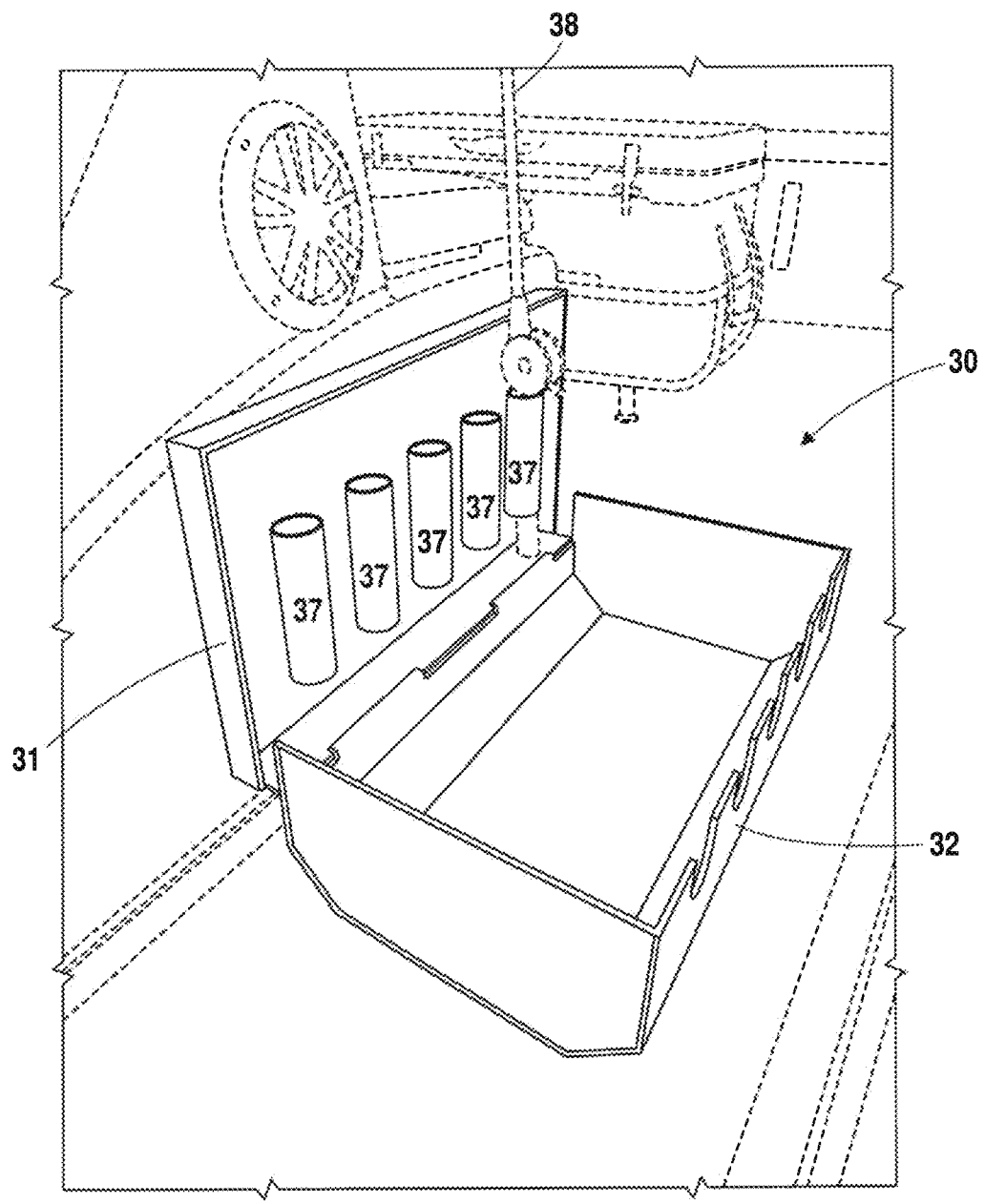
FIG. 7 is a perspective view of the first embodiment of the rod holder in the open position mounted on a boat.
Figure 8:
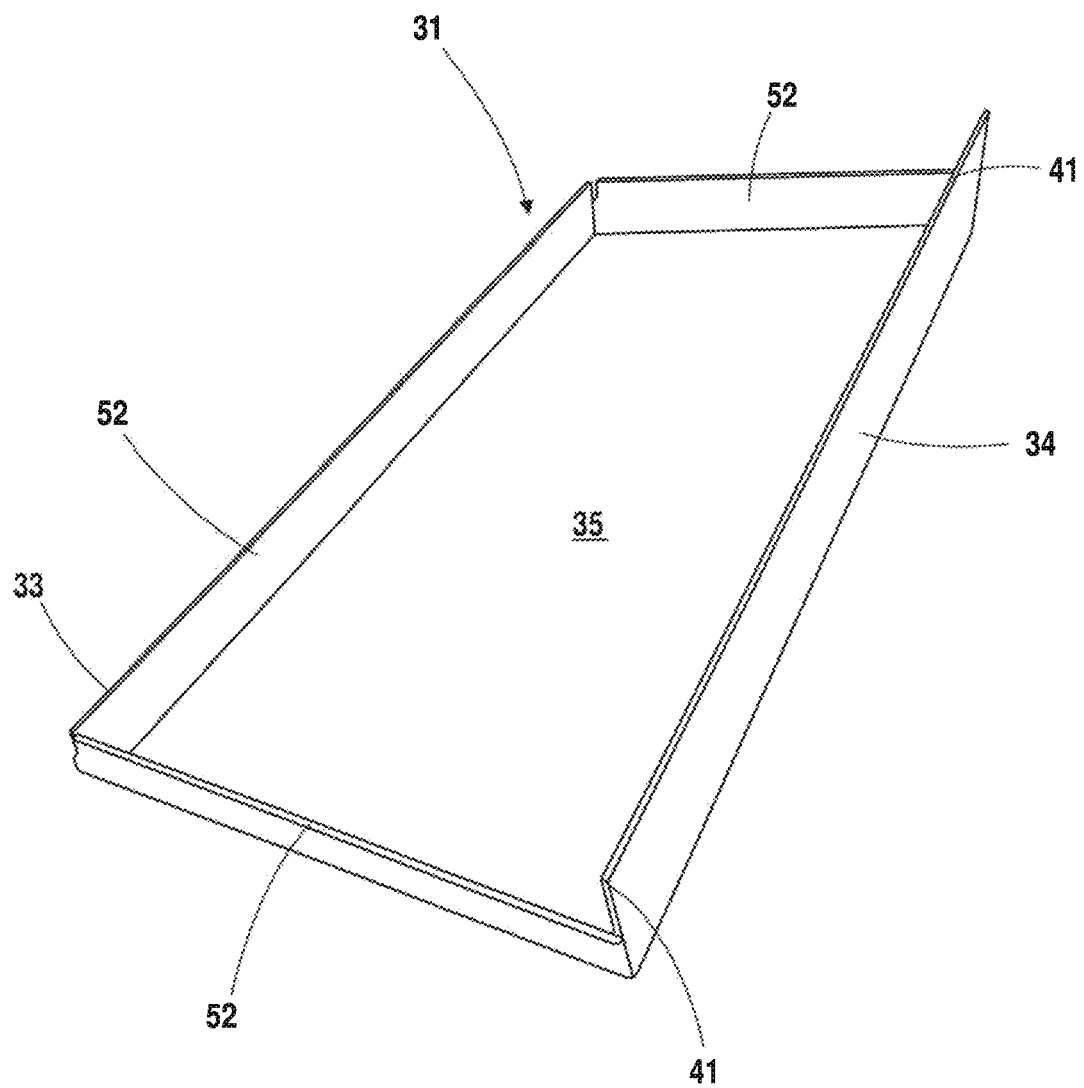
FIG. 8 is a deconstructed view of a first embodiment of the back plate.
Figure 9:
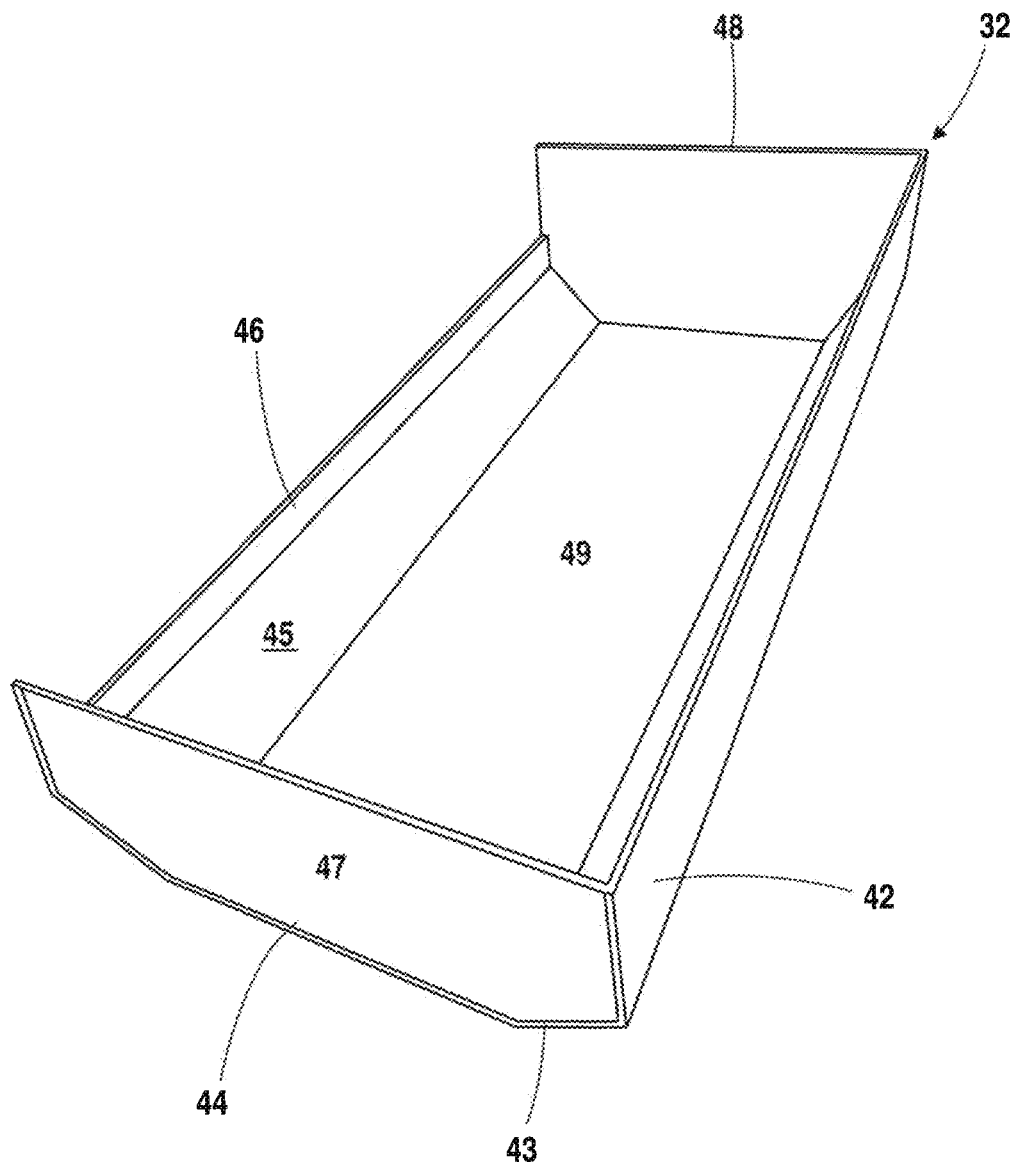
FIG. 9 is a deconstructed view of a first embodiment of the cover.
Figure 10:
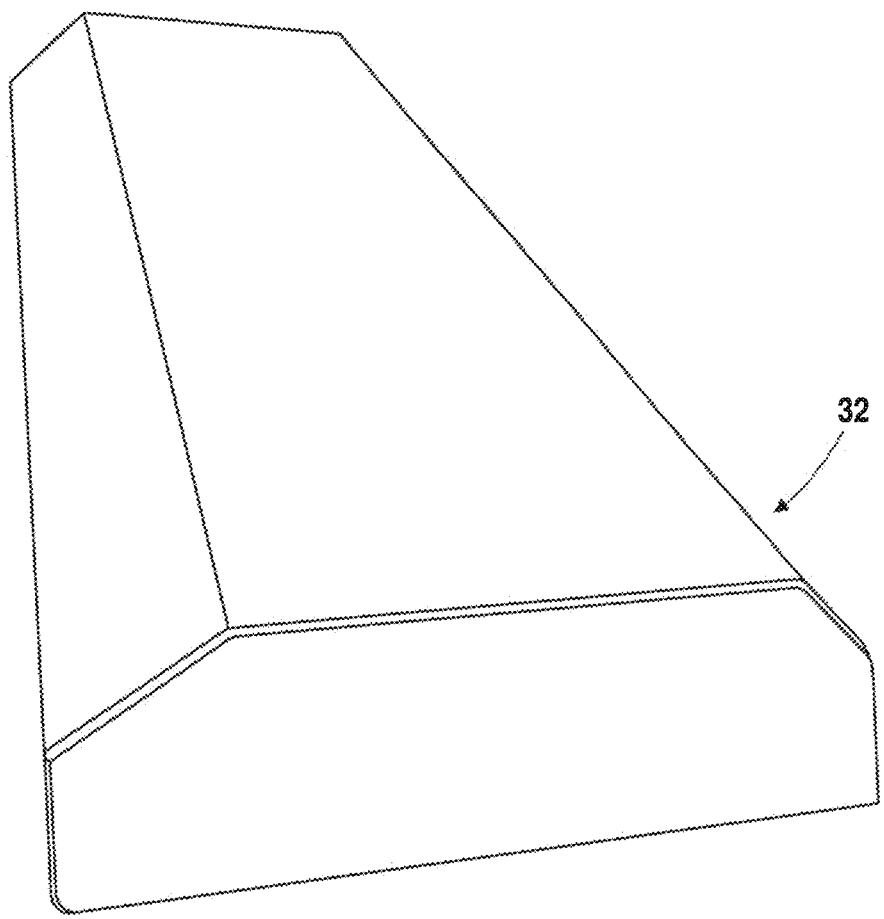
FIG. 10 is a deconstructed view of a first embodiment of the cover.

Referring to FIGS. 1,2, 4-10, a first embodiment of the rod holder 30 comprises a back plate 31 and a cover 32.

The back plate 31 is rectangular and preferably constructed from aluminum. The back plate has a top end 33 and a bottom end 34. The back plate 31 has an interior side 35 and an exterior side 36. A collared lip 52 is integral to the perimeter top end 33 and sides on the interior side 35 of the back plate 31. A shelf 41 is integral the bottom side 34 of the interior side 35 of the back plate.

A plurality of hollow cylindrical tubes 37 are welded or otherwise adhered to the interior surface of the 35 of the back plate. The number of cylindrical tubes can vary based on the desire of the user. A single tube could be used. The embodiment shown in the Figures has five tubes 37. The height of the tubes 37 is shorter than the height of the back plate 31. The circumference of the tubes 37 is at least slightly larger than the circumference of a standard fishing rod 38.

The cover 32 is irregular shaped. The cover 32 has a first hexagonal end plate 47 and a second hexagonal end plate 48. A first rectangular surface 42, second rectangular surface 43, third rectangular surface 44, fourth rectangular surface 45, and fifth rectangular surface 46 extend between the first hexagonal end plate 47 and second hexagonal end plate 48, each rectangular surface corresponding to a different side of the hexagonal end plates. The width of the fifth rectangular plate 46 is shorter than the width of the fifth side of the hexagonal end plates. There is no corresponding rectangular plate for the sixth side of the hexagonal plate, resulting in the cover 32 resembling a trough and having a volume 49 within the cover 32. The width of the cover 32 is slightly longer than the width of the back plate 31.

The cover 32 is attached to the back plate 31 via an interlocking S type bend fit. Using an interlocking S type bend fit allows the cover to be removed from the back plate without any tools, while still securing it in place and not allowing anyone to be able to remove without opening the front plate/door first. In alterative embodiments, the cover 32 can be attached to the back plate 31 via a hinge(s). The hinges can be a bolt and aperture hinge system.

The cover can be alternated between an open position and a closed position. A locking mechanism allows the user to secure the cover in the closed position when desired. In one embodiment, there are locking mechanisms at the top of each corner.

In some embodiments, the first rectangular plate 42 of the cover has a plurality of partial circular apertures 51. The collared lip 52 integral the interior side of the top end 33 of the back plate may have corresponding partially circular apertures. The purpose of the apertures is to allow rods placed in the cylindrical tubes 37 to extend through the rod holder 30 when the rod holder is in the closed position. The apertures 51 have a diameter smaller than the width of a standard fishing reel, therefore making it impossible for a fishing rod and reel to be pulled through the apertures when the rod holder 30 is closed. The apertures could be other shapes, such as squares, ovals, or triangles, as desired by the user.

In some embodiments, a cargo platform 53 extends from the rod holder 30 proximate the bottom end of the rod holder. In one embodiment, the cargo platform 53 is rectangular with a rectangular collar 54 and rectangular shelf 55.

When the rod holder 30 is in the closed position, the rod holder 30 acts as a toolbox. In addition to, or alternatively to, fishing rods, the user can safely store tools or other things inside the enclosed space of the closed rod holder 30.

When the rod holder 30 is in the open position, the cover 32 acts as a platform the user can use as a utility table. The S type interlocking fit is strong enough that weight can be placed on the cover 32 when the cover is used as a utility table.

The rod holder 30 may comprise a first lock 56 so the cover 32 can be locked in the closed position. The rod holder 30 may comprise a second lock 58 so the rod holder 30 can be locked to a truck, boat, or other surface to prevent someone from carrying off the rod holder 30.

A bracket 57 can be affixed to the exterior surface 35 of the back plate 31. The bracket 57 is used to securely attach the rod holder 30 to a truck, boat, or other type of vehicle. In one embodiment, the bracket 57 is a basic flat aluminum plate that will mount to a brush guard, house wall, boat flat panel or even in the bed of a truck. The bracket 57 will allow you to attach and detach from the plate when needed and have its own lock system for security.

Figure 11:
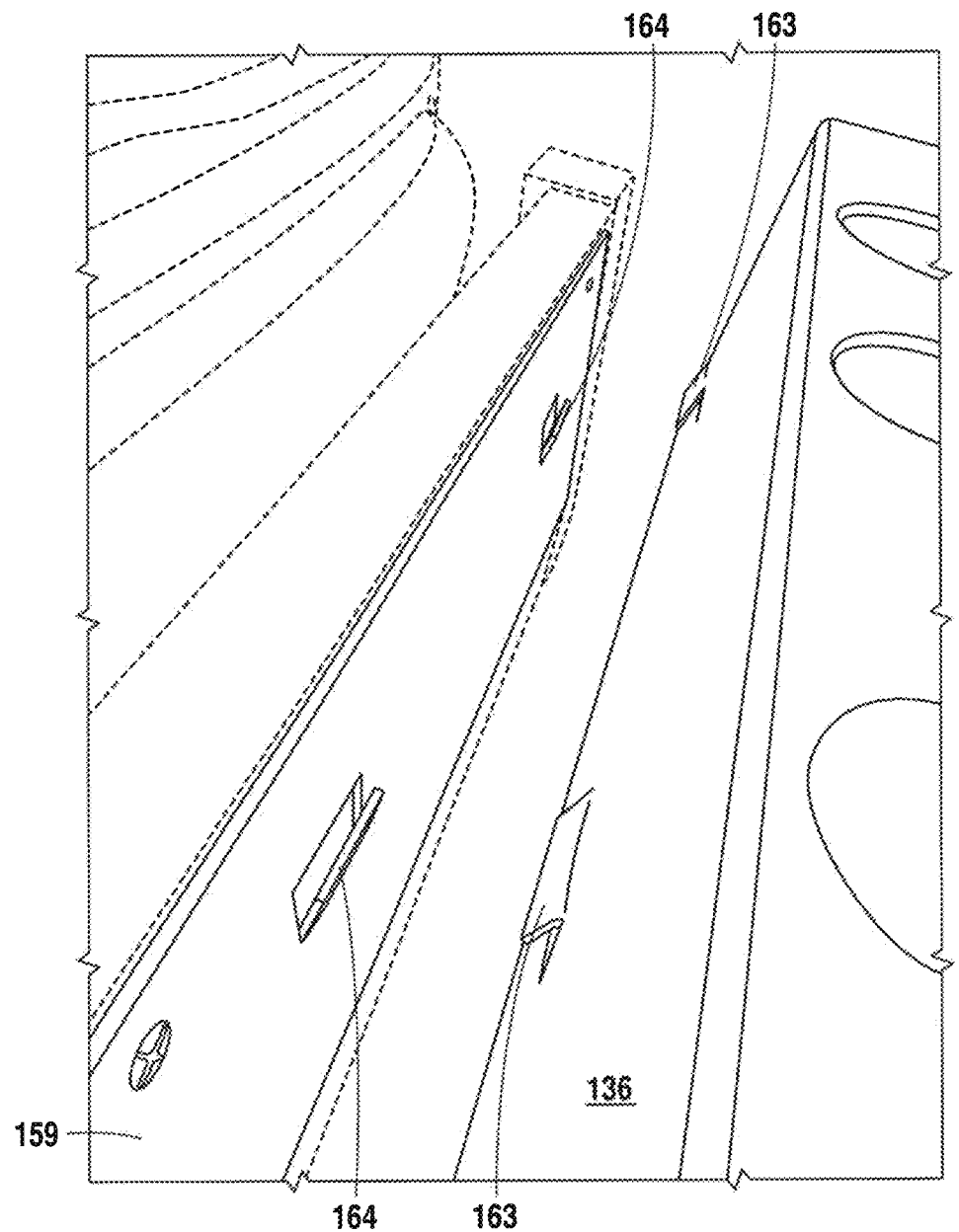
FIG. 11 is a perspective view of the mounting plate and back plate of a third embodiment of the rod holder.
Figure 12:
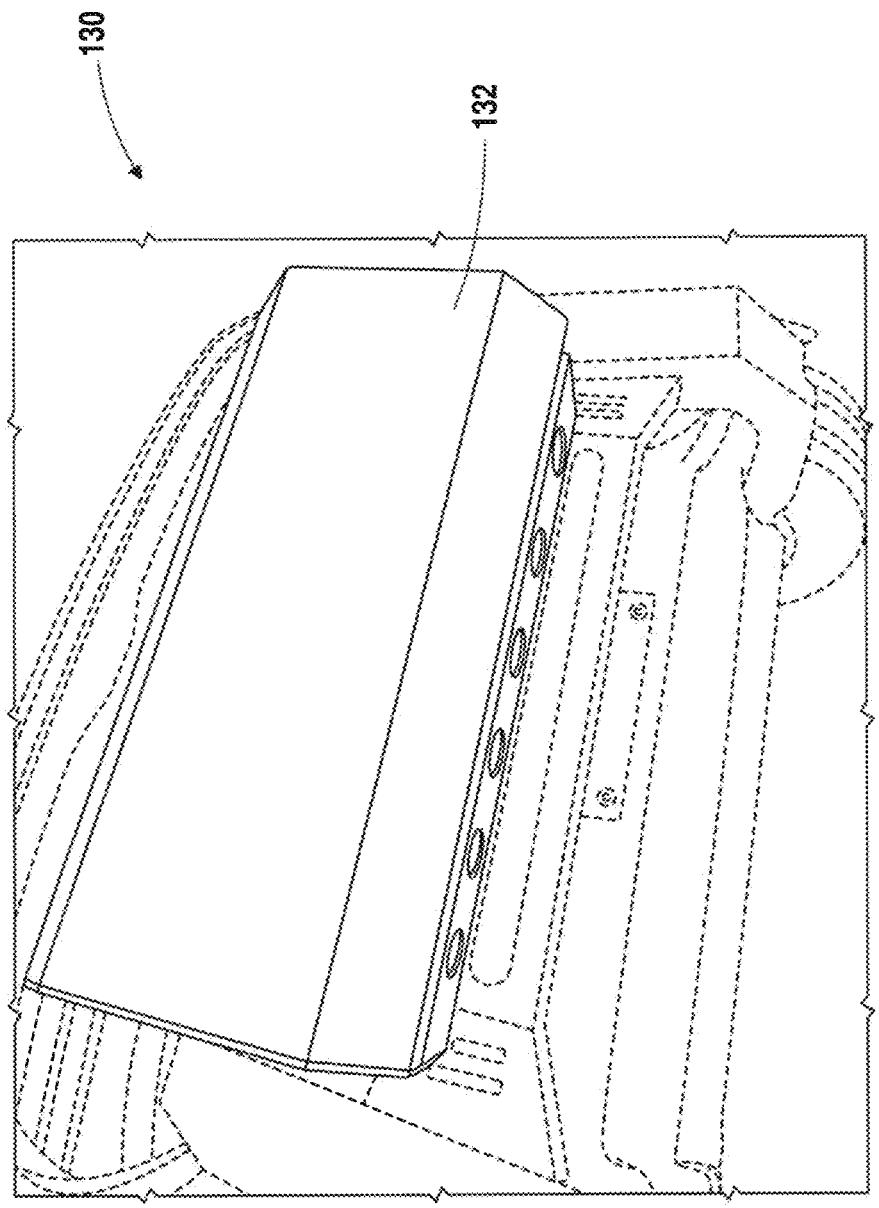
FIG. 12 is a perspective view of a third embodiment of the rod holder in the closed position.
Figure 13:
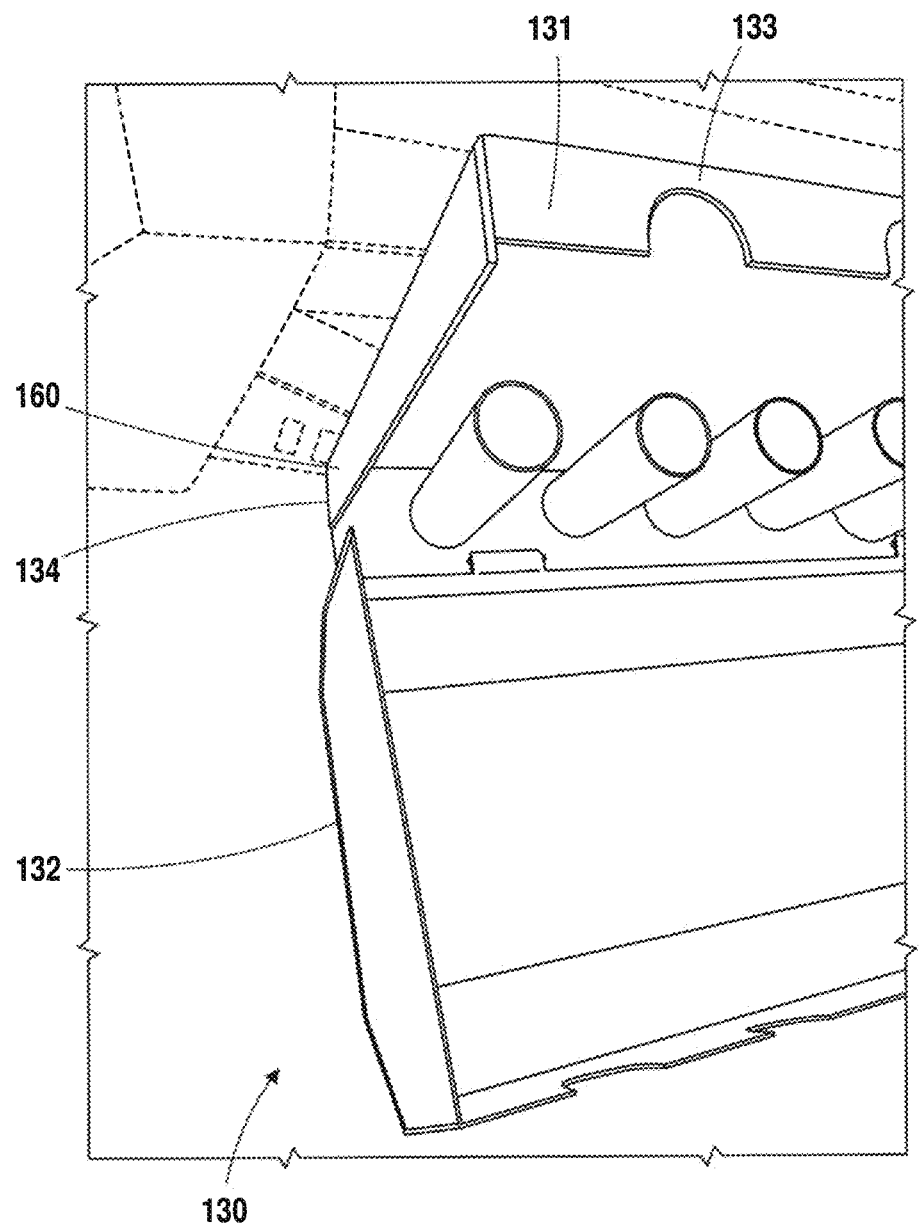
FIG. 13 is a partial perspective view of the third embodiment of the rod holder in the open position.
Figure 14:
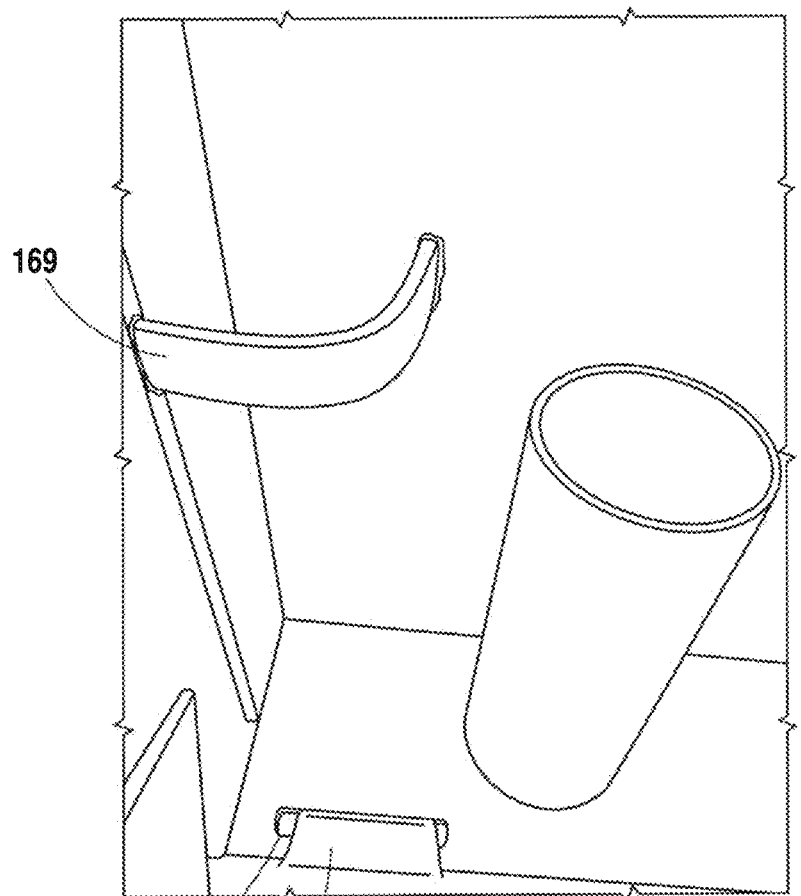
FIG. 14 is a partial perspective view of a fourth embodiment of the rod holder in the open position.
Figure 15:
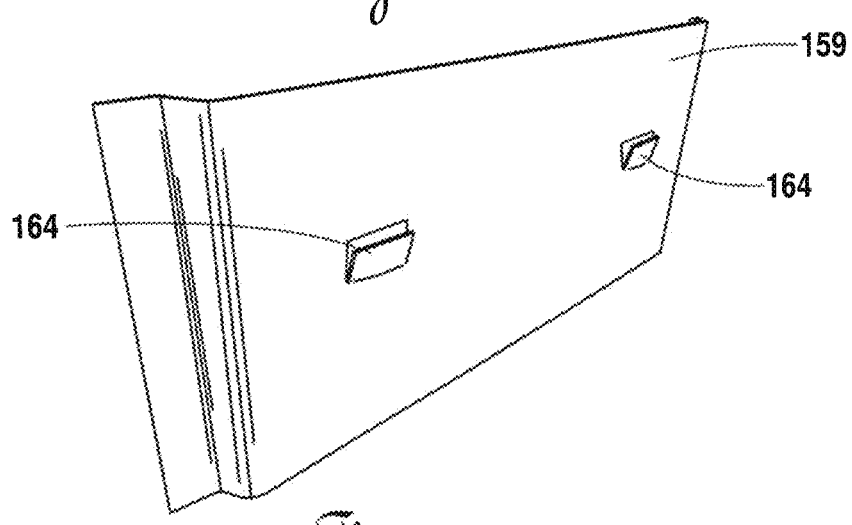
FIG. 15 is a perspective view of the mounting plate.
Figure 16:
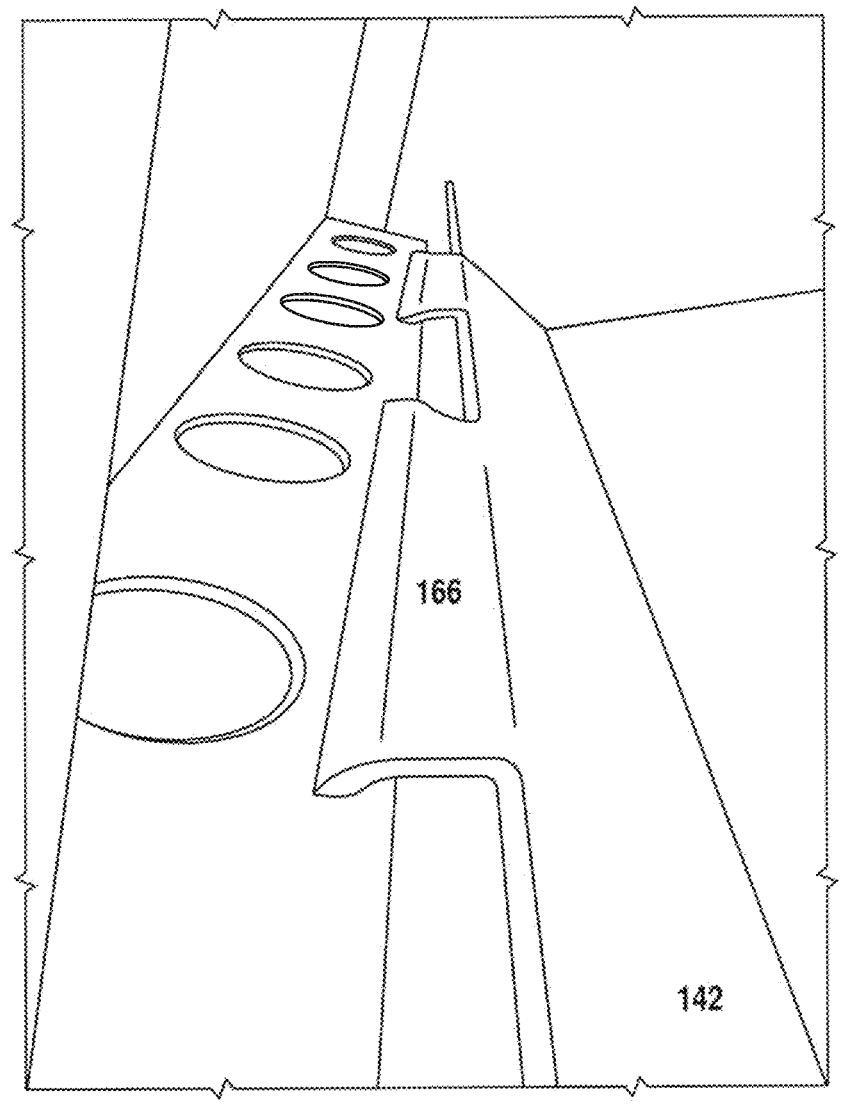
FIG. 16 is a blow-up view of the hinge.
Figure 17:
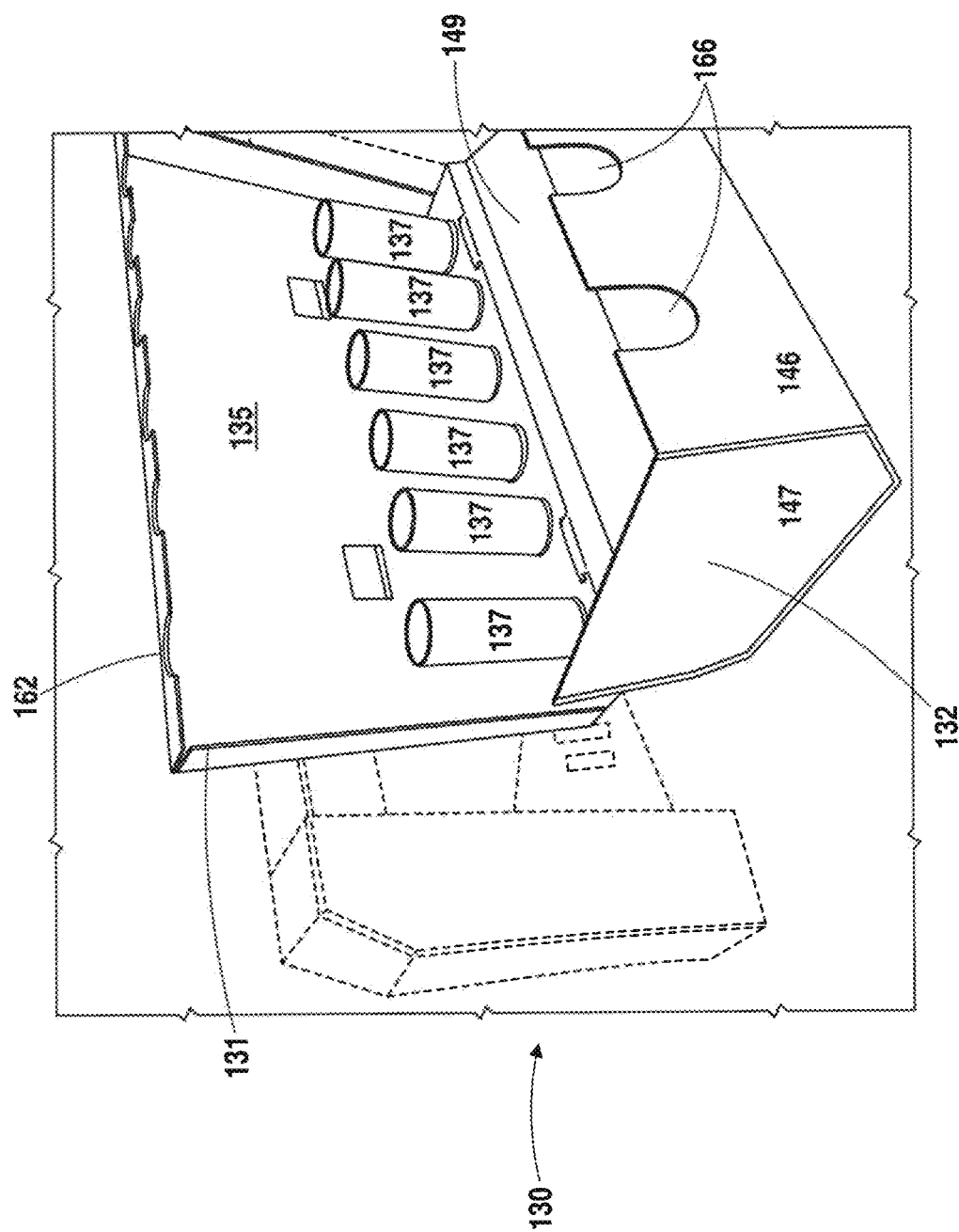
FIG. 17 is a partial perspective view of the third embodiment of the rod holder in the open position.
Figure 18:
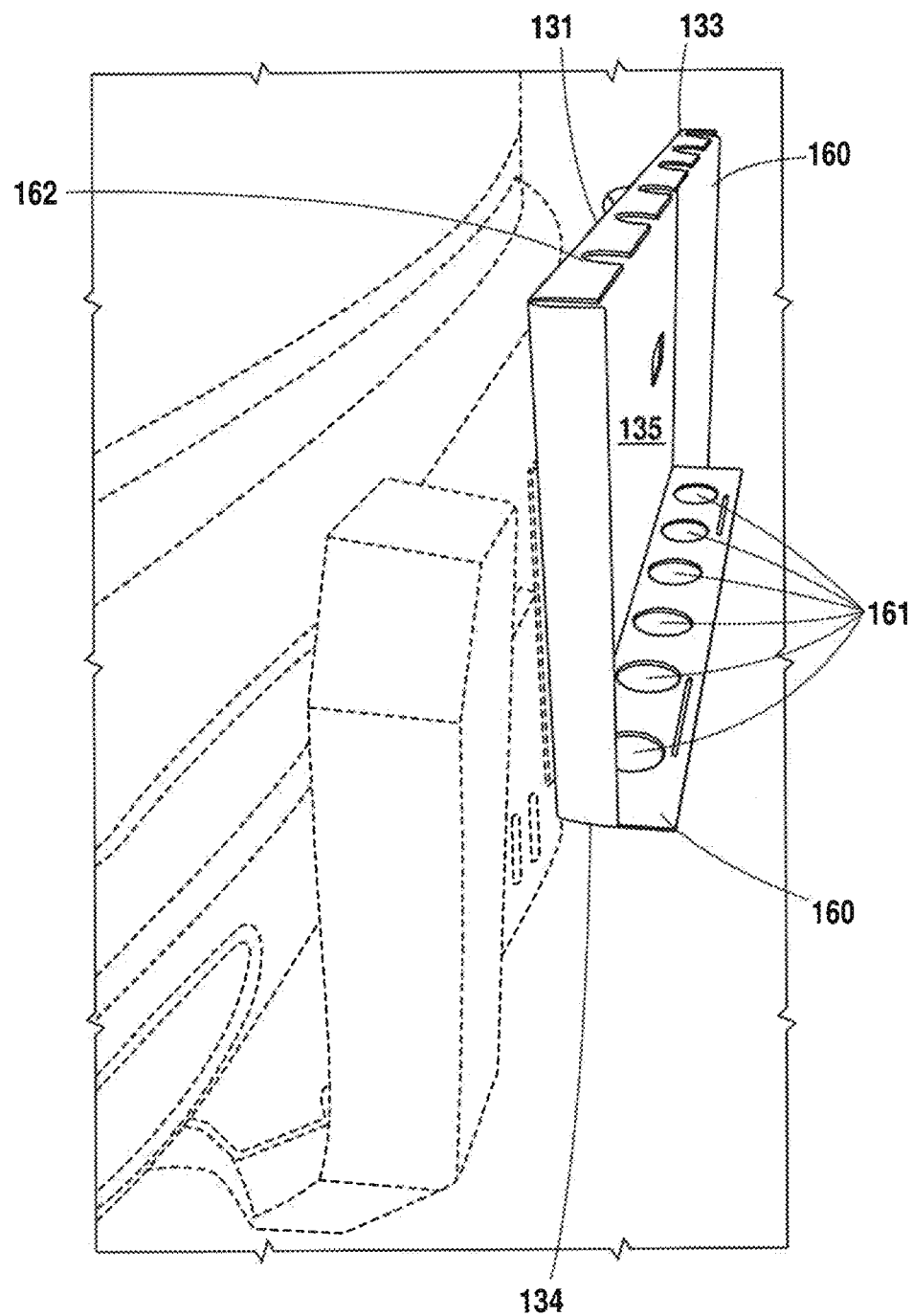
FIG. 18 is a side view of the back plate.
Figure 19:
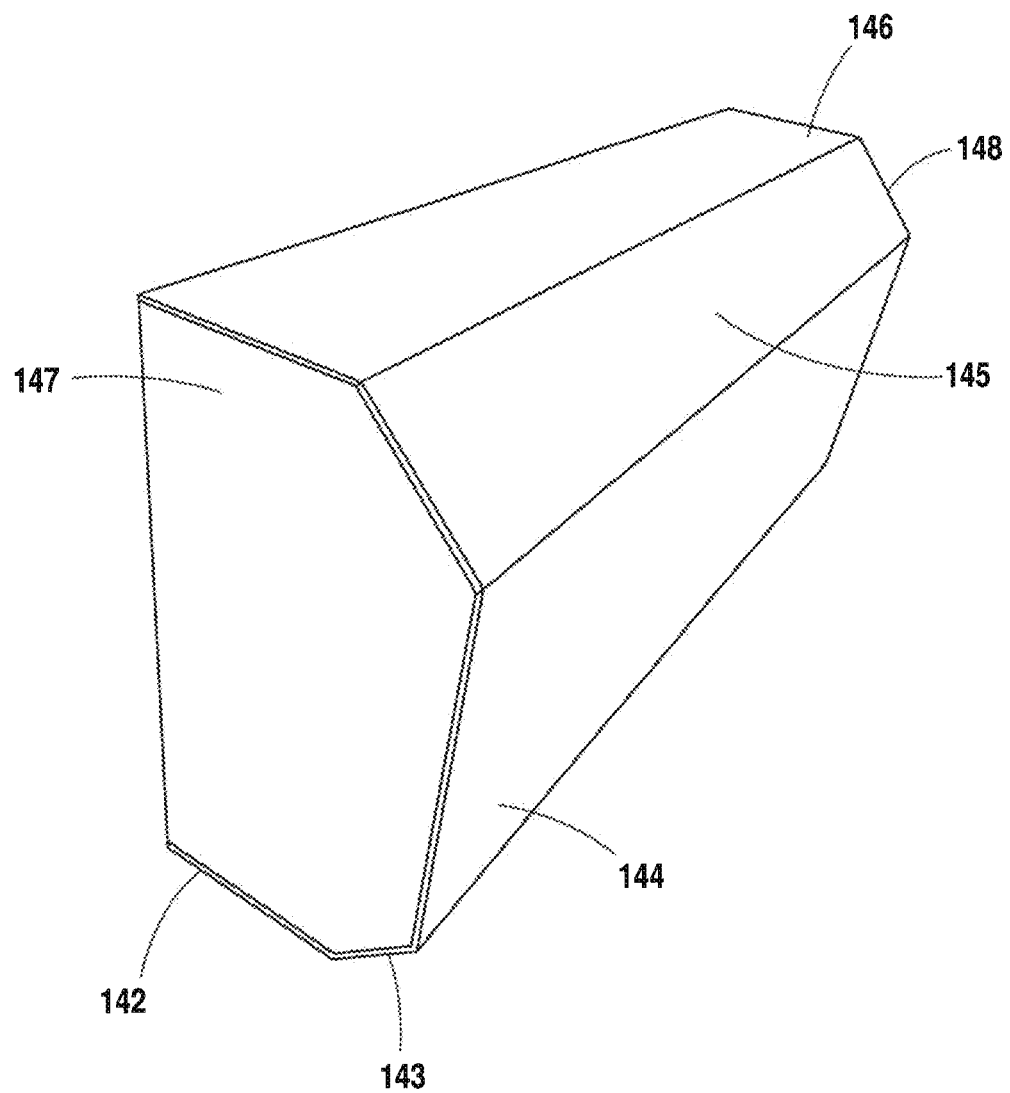
FIG. 19 is a perspective view of the third embodiment of the rod holder in the closed position.
Figure 20:
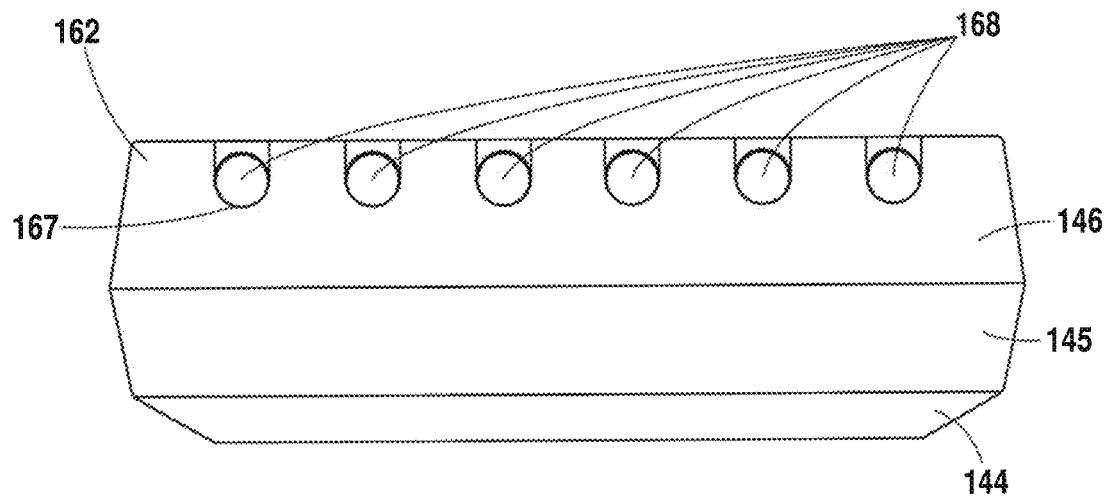
FIG. 20 is a top view of the third embodiment of the rod holder in the closed position.
Figure 21:
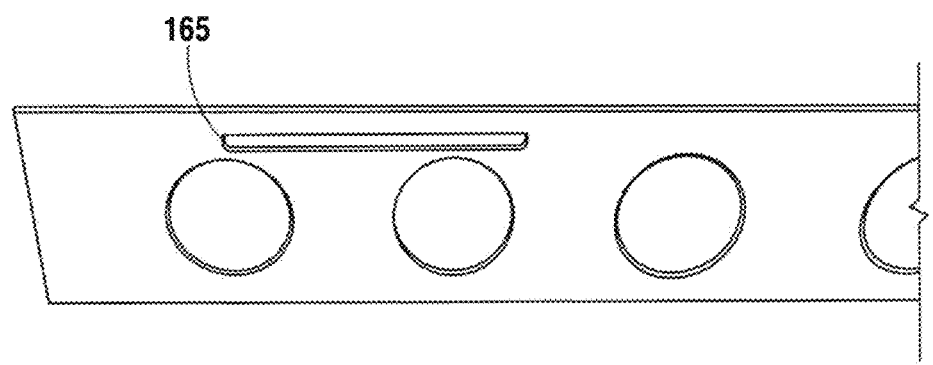
FIG. 21 is a blown-up view of a hinge slit.

Referring to FIGS. 11-19, a third embodiment 130 of the rod holder comprises a back plate 131, cover plate 132, and mounting plate 159.

The back plate 131 is rectangular in shape with a top end 133, bottom end 134, interior surface 135, and exterior surface 136. A rim 160 extends from the interior surface 135 along the edge of the back plate 131. Two mounting flange receptacles 163 extend out of the exterior surface 136 of the back plate 131.

The mounting plate 159 can be attached to a vehicle or other surface. The mounting plate 159 has two mounting flanges 164. The back plate 131 can be mounted to the truck by placing the back plate 131 onto the mounting plate 159 so that the mounting flanges 164 of the mounting plate 159 are inserted into the mounting flange receptacles 163 of the back plate 131, forming a snug fit.

Cylindrical tubes 137 are welded, or otherwise affixed, onto the backplate 131. The cylindrical tubes 137 could be welded or otherwise affixed to the interior surface 135 of the back plate 131. Circular apertures 161 extend through the rim 160 of the back plate 131 along the bottom end 134. The circular apertures 161 are coaxial with the cylindrical tubes 137, and have approximately the same diameter. Partial circular cut outs 162 are cut out of the rim 160 along the top end of the 133 of the back plate 131. The partial circular cut outs 162 are coaxial with the cylindrical tubes 137 and circular apertures 161.

The diameter of the apertures 161 and partial cut outs 162 is smaller than the width of a standard fishing reel, therefore making it impossible for a fishing rod and reel to be pulled through the apertures when the rod holder 30 is closed. The apertures could be other shapes, such as squares, ovals, or triangles, as desired by the user.

The rim 160 along the bottom end 134 of the back plate 131 may further comprises one or more hinge receptacles 165. The hinge receptacles 165 can be cut-out slits.

The cover 132 is irregular shaped with a first hexagonal end plate 147 and a second hexagonal end plate 148. A first rectangular surface 142, second rectangular surface 143, third rectangular surface 144, fourth rectangular surface 145, and fifth rectangular surface 146 extend between the first hexagonal end plate 147 and second hexagonal end plate 148, each rectangular surface extending between a different side of the corresponding hexagonal end plates 147 148.

There is no corresponding rectangular plate for the sixth side of the hexagonal plate, resulting in the cover 132 resembling a trough when in the open position and having a volume 149 within the cover 132.

One or more hinge flanges 166 may extend from the first rectangular surface 142. The hinge flanges 166 are inserted into the hinge receptacles 165 of the back plate 131, creating a hinge fit between the cover 132 and the back plate 131. The hinge flanges 166 may be curved, to act as a stop mechanism for rotation of the cover. The curvature of the hinge flanges 166 prevent the cover 132 from rotating more than ninety degrees away from the back plate 131. In some embodiments, a barrel hinge, piano hinge, or other suitable hinge could be used.

The fifth rectangular surface 146 may have partial circular cut outs 167. When the rod holder is in the closed position, the partial circular cut outs 167 of the cover 132 are coaxial with the partial circular cutouts 162 of the back plate 131, forming a combined full circle aperture 168. The apertures 168 have a diameter smaller than the width of a standard fishing reel, therefore making it impossible for a fishing rod and reel to be pulled through the apertures when the rod holder 130 is closed. The apertures could be other shapes, such as squares, ovals, or triangles, as desired by the user.

Some embodiments include a tool holder 169.

The rod holder 130 is used by affixing the mounting plate 159 to an automobile or other surface. The back plate 131 is then attached to the mounting plate by connecting the mounting flanges 164 of the mounting plate 159 with the mounting receptacles 163 of the back plate 131. The cover 132 is connected to the back plate 131 via hinges. In some embodiments, hinge flanges 166 of the cover 132 are inserted into hinge slits 165 of the back plate.

The hinge is designed to only allow the cover to rotate toward the top end 133 of the back plate 131. The cover 132 cannot rotate more than approximately ninety degrees from the back plate. The hinge holds the cover 132 substantially level with the rim of the back plate 131 when the cover is in the open position.

Fishing rods can be stored in the cylindrical tubes 137. Other tools, equipment, and various things can be stored within the volume 149 of the cover 132.

The cover 132 is closed by rotating the cover upwards so that the fifth rectangular surface 146 rests atop the top end 133 of the back plate. The cover can be secured in place via a lock, or other type of fastening mechanism.

I claim:

1. A rod holder comprising:
   a back plate and a cover;
   wherein the back plate has a top end, a bottom end, and a rim, with a plurality of cut-outs in the rim along the top end;
   wherein the cover has a plurality of cut-outs;
   wherein the back plate has a plurality of cylindrical tubes;
   wherein, the cover is rotatable from a closed position to an open position via an interlocking S type bend fit between the cover and the back plate, and when the cover is in the closed position, the plurality of cut-outs of the cover combine with the plurality of cut-outs of the back plate to form a plurality of apertures;

wherein, when in the closed position, said plurality of apertures are coaxial with the cylindrical tubes;

wherein the cover comprises a first hexagonal end plate and a second hexagonal end plate, with a first rectangular surface extending between a first side of the hexagonal end plates, a second rectangular surface extending between a second side of the hexagonal end plates, a third rectangular surface extending between a third side of the hexagonal end plates, a fourth rectangular surface extending between a fourth side of the hexagonal endplates, and a fifth rectangular surface extending between a fifth side of the hexagonal end plates.

2. The rod holder of claim 1 wherein said cut-outs of the cover are on said fifth rectangular surface.

* * * * *